United States Patent [19]

Lawson, II

[11] 4,330,843

[45] May 18, 1982

[54] DIGITAL DISPLAY EXERCISER

[75] Inventor: Charles A. Lawson, II, Linthicum, Md.

[73] Assignee: Westinghouse Electric Corp., Pittsburgh, Pa.

[21] Appl. No.: 100,171

[22] Filed: Dec. 4, 1979

Related U.S. Application Data

[63] Continuation-in-part of Ser. No. 950,358, Oct. 11, 1978, abandoned.

[51] Int. Cl.[3] .......... G06F 3/14

[52] U.S. Cl. .......... 364/900

[58] Field of Search .......... 364/200, 900, 492, 578, 364/504; 176/19 R

[56] References Cited

U.S. PATENT DOCUMENTS

| | | | |
|---|---|---|---|
| 3,579,196 | 5/1971 | Gregg, Jr. et al. | 364/900 |
| 3,623,005 | 11/1971 | Roberts, Jr. | 364/900 |
| 3,654,620 | 4/1972 | Bartocci | 364/900 |
| 3,895,357 | 7/1975 | Schwartz et al. | 364/200 |
| 3,936,885 | 2/1976 | Mutafelija | 176/19 R |
| 3,942,157 | 3/1976 | Azure | 364/900 |
| 4,053,951 | 10/1977 | Hudspeth et al. | 364/900 |
| 4,125,871 | 11/1978 | Martin | 364/900 |

*Primary Examiner*—Mark E. Nusbaum
*Assistant Examiner*—Gary Chin
*Attorney, Agent, or Firm*—M. P. Lynch

[57] ABSTRACT

In a data acquisition and storage system including a plurality of remote data generating units, a data processor/display unit for addressing the respective data generating units, processing the data for storage and providing a visual display of the process data, and a computer having random access to the stored data of the processor/display unit to selectively update stored information, a display exerciser is connected in parallel with the processor/display unit and provides the capability of both recirculating data from storage and the processor/display unit through the display unit as well as introducing operator initiated data.

2 Claims, 5 Drawing Figures

DIGITAL DISPLAY EXERCISER

CROSS-REFERENCE TO RELATED APPLICATIONS

This is a continuation-in-part of Application Ser. No. 950,358, filed Oct. 11, 1978, now abandoned.

BACKGROUND OF THE INVENTION

In complex and sophisticated data acquisition and control systems, such as that associated with a nuclear power plant, data from numerous discrete locations within a facility is typically multiplexed through a data interface and processing unit for ultimate access and storage by a central data processing and control initiating computer. The requirement for operator awareness of the status of operating conditions within the facility necessitates the inclusion of a control room installation whereby an operator can monitor the facility conditions represented by the data being transmitted from the remote facility locations to the central computer.

In addition to the normal operation of transmitting data to a central computer, there is significant advantage realized if a control room operator can periodically substitute the recirculation of stored data to verify the system interface operational capability as well as to familiarize a control room operator with the operational profile variations of the facility. This recirculating capability coupled with the capability of introducing simulated data provides an opportunity to initiate system tests, and implement program changes for unique facility operational parameters and alarm set points.

SUMMARY OF THE INVENTION

There is disclosed herein with reference to the accompanying drawings a digital display exerciser for a data acquisition and storage system wherein data from at least one data source is not only processed for display but also is stored for computer address access of the data in response to periodically generated display addresses. The data acquisition and storage system includes a data processor means having an input and an output, and including means for generating display addresses for addressing at least one of the data sources and causing the data from the data source to be supplied to the input of the data processor means. A display means is operatively connected to the outputs of the data processor means to provide a visual display of the processed data. There is further included a storage means for retaining in storage locations corresponding to the display addresses of at least one data source, the data from said data source such that circuit means responsive to a computer address data request can access data stored in the storage means and make the data available to the computer. A display exerciser is provided which can be connected between the inputs and outputs of the data processor/display system thereby disconnecting the data source inputs and the computer from the data processor/display system. The display exerciser includes a capability of recirculating stored data from the processor/display system to the inputs of the processor/display system to determine the operational integrity of the processor/display system, as well as the capability of introducing operator initiated input information to the data processor/display system to simulate data received from the previously disconnected data sources as well as providing training opportunities for control room operators.

In the normal operation of the data acquisition and display system, wherein the display exerciser is disconnected from the processor/display unit, data from a remote data source is identified by an address, and the multiplexed data from each of several data sources during a data scan of the remote data sources is processed for display purposes by the processor/display unit during the first $\frac{3}{4}$ of each address period. The multiplexed data is also stored in memory and is made accessible for external interrogation by a central computer during the last $\frac{1}{4}$ of the address period. When it is desired to determine the operational integrity of the processor/display unit, or to introduce simulated input data, the remote data sources and the computer are disconnected from the display/processor unit and the display exerciser is connected in parallel with the processor/display unit. The display exerciser is synchronized to the address A of the processor/display unit and increments the address by one, i.e., A+1. This action accomplishes the external interrogation of the memory containing the previously processed and stored input data by selecting the next address during the first $\frac{1}{4}$ of each address period and recirculating the data retrieved from that address through the display exerciser to the input of the display/processor unit. A delay in displaying the data through the display exerciser produces a result which is equal to one full data scan. Thus, the data that is provided to the input of the processor/display unit by the display exerciser as new data is indeed the recirculated old data from the preceding data scan.

The display exerciser not only permits the operator to recirculate the data from the data stored in memory but also permits the introduction of operator initiated data as input data to the processor/display unit.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
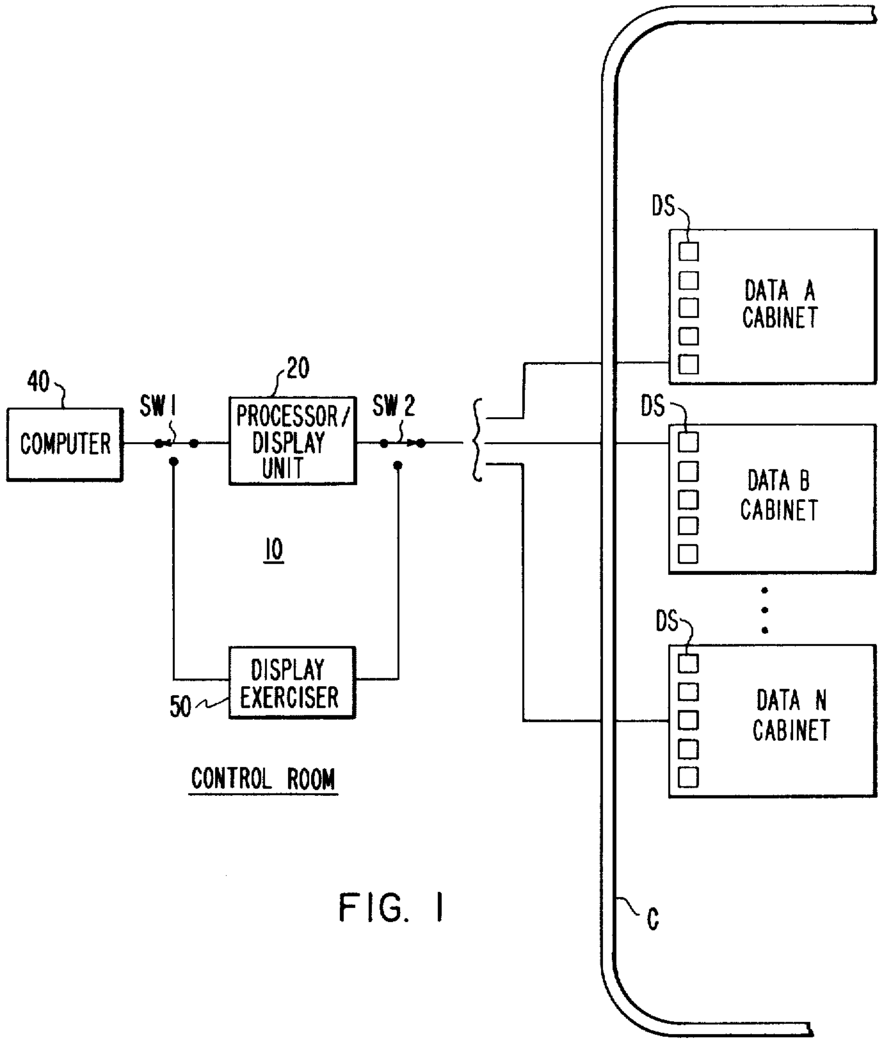
FIG. 1 is a block diagram schematic illustration of a data acquisition system incorporating the invention.

Referring to FIG. 1, there is illustrated in block diagram form a data acquisition and display system 10 including a processor/display unit 20 which processes and displays data received from the data sources DS of the remote data locations herein illustrated as consisting of data cabinets, A, B, . . . N, and provides the processed data for access by a central computer 40. The remote data locations, as represented by data cabinets A, B, etc. can represent any of numerous sources of data information with the data sources DS being groups of control rods within the containment C of a nuclear power plant.

The processor/display unit 20 functions as a data correlator and local display of processed data. Parallel multiplexing is used to obtain data from the data cabinets A, B, etc. The processor/display unit 20 consists of a processing section and a display section. The processing section of the unit 20 generates a sequence of addresses corresponding to the data sources DS and sequentially processes the data, stores it in a random access memory and displays the resultant information in the display section of the processor/display unit 20.

The central computer 40 accesses the memory of the processor/display unit on a non-synchronous, or random basis, i.e., the computer requests data corresponding to a computer address which is independent of the display address used by the processor/display unit 20 to access the data cabinets. The processor/display unit 20 responds to the address request from the central computer 40 and initiates a data search in its memory within a specifically allocated time period. The multiplexed data received by the processor/display unit 20 is processed by the processor/display unit and stored in the random access memory during the first ¾ of the display address period initiated by the processor/display unit. The random access memory of the processor/display unit 20 is accessible by the central computer 40 during the last ¼ of the display address period S.

The above general description defines the normal mode of operation of the data acquisition and processing system 10 wherein information from the remote data sources is processed, displayed and made available through the unit 20 for access by the computer 40. The display exerciser 50 provides both the capability of interrogating the operational integrity of the processor/display unit 20 and the capability of introducing simulated data input to the processor/display unit 20 for operator familiarization and training. When it is desired to employ the capabilities of the display exerciser 50 the switches SW1 and SW2 are located so as to disconnect the computer 40 and the data sources DS from the unit 20 and to connect the display exerciser 50 in parallel with the processor/display unit 20.

Figure 2:
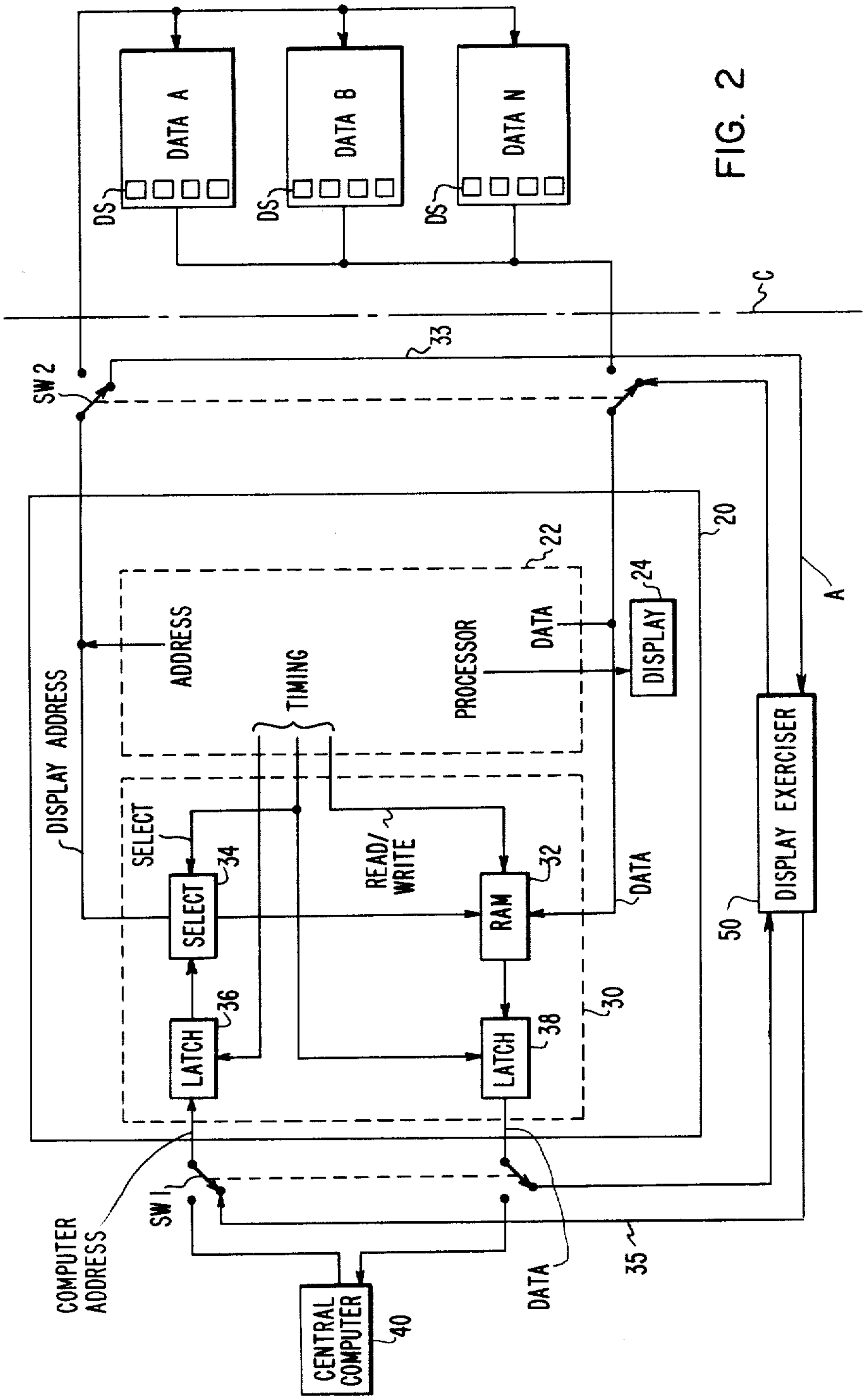
FIG. 2 is a schematic illustration of the processor/display circuitry of the system of FIG. 1.

A schematic implementation of the processor/display unit 20 of FIG. 1 is depicted in FIG. 2. In the embodiment illustrated in FIG. 2 the switches SW1 and SW2 have been positioned to disconnect computer 40 and the data cabinets A and B from the processor/display unit 20 while connecting in parallel the display exerciser 50 to establish the data acquisition system 10 in a recirculating mode. In this mode the display exerciser 50 recirculates data from the computer interface circuit 30 as "new" input data for a processing, display and storage by the processor/display unit 20. The display exerciser 50 reorders the timing to achieve a continuous, synchronous mode of operation. As the computer interface circuit 30 is accessible during the last ¼ of each display address period, the display exerciser 50 increments the display address A by 1, i.e., (A+1), and interrogates the computer interface circuit 30 for the "next" successive address. In this manner the stored data of the computer interface circuit is synchronously accessed during the first ¼ of the new cycle and the data is recirculated as input data to the processor/display unit 20 during the last ¾ of the new cycle.

Figure 4:
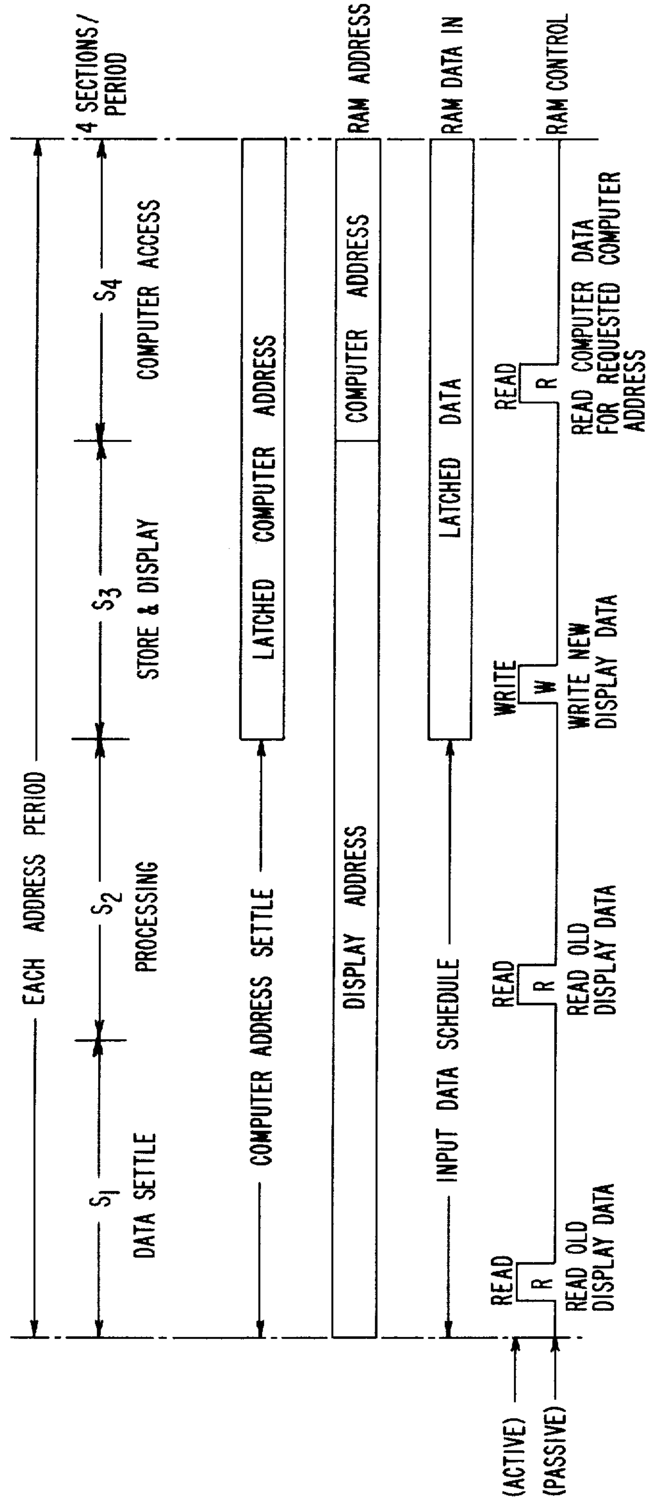
FIG. 4 is an illustration of an address period of the system of FIG. 1.

The processor/display unit 20 is illustrated as consisting of processor 22, display means 24 and a computer input/output interface circuit 30 which effectively acts as an extension of the computer 40 and operatively couples the processor circuit 22 to the computer 40 when the switches SW1 and SW2 are positioned as illustrated in FIG. 1 to establish the system 10 in a normal mode of operation. Each display address A generated by the processor circuit 22 consists of an address format which is subdivided into four segments or sections S1, S2, S3 and S4 are illustrated in FIG. 4. The address A functions to select the appropriate data source DS as well as initiate selection of the appropriate memory location in the random access memory 32 of the computer input/output circuit 30 via a select circuit 34 which may be implemented as an OR gate.

Referring to FIG. 4, the S1 period allows for data delay and settling. During the S2 period, the data from the appropriately addressed data cabinet is transmitted as data input to the processor circuit 22 for processing and display on the display circuit 24 as well as being transmitted as input data to the random access memory 32. During the S3 period of the display address, information displayed on display circuit 24 is refreshed and the presence of a computer address from the computer 40 is latched in latch circuit 36 of the computer input/output circuit 30. As described above, the computer address is random and is not synchronized with the display address and thus need not correspond to the data information being addressed by the display address S of the processor circuit 22. The select circuit 34 gates the computer address from the latch circuit 36 to the random access memory 32. During the S4 period of the computer address A, the display operation has been completed and the computer input/output circuit 30 completes a data search corresponding to the computer address which was latched in latch circuit 36 during the S3 period of the display address.

Figure 5:
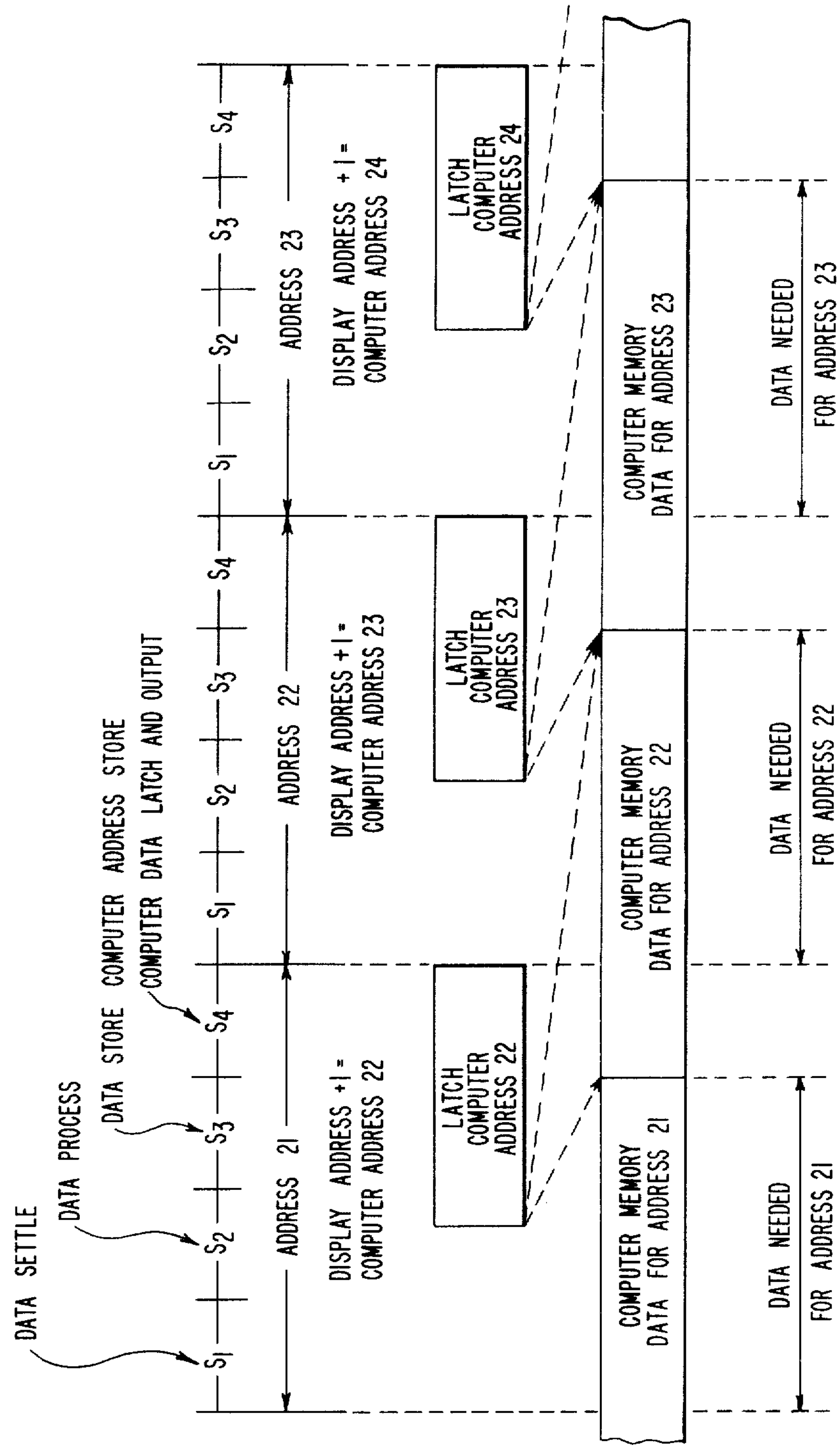
FIG. 5 is an illustration of the reordering of the computer address accomplished by incrementing the address by "+1" as accomplished by the display exerciser of FIG. 3.

The correlation of the display address format S with the computer address in the computer input/output circuit 30 is illustrated in FIGS. 4 and 5. During the S1/S2 address periods of the display address, the old data is being retrieved from Random Access Memory 32 and stored in buffers. During the S3 address period, new data is being written into Random Access Memory 32 and is also compared with old data in buffers. A difference signifies a "change in data" and is used to alert computer 40 of a data change. During the S4 period, the random access memory 32 responds to the computer address in latch circuit 36 and the computer requested data is retained in circuit 38 as data input to the computer 40.

Figure 3:
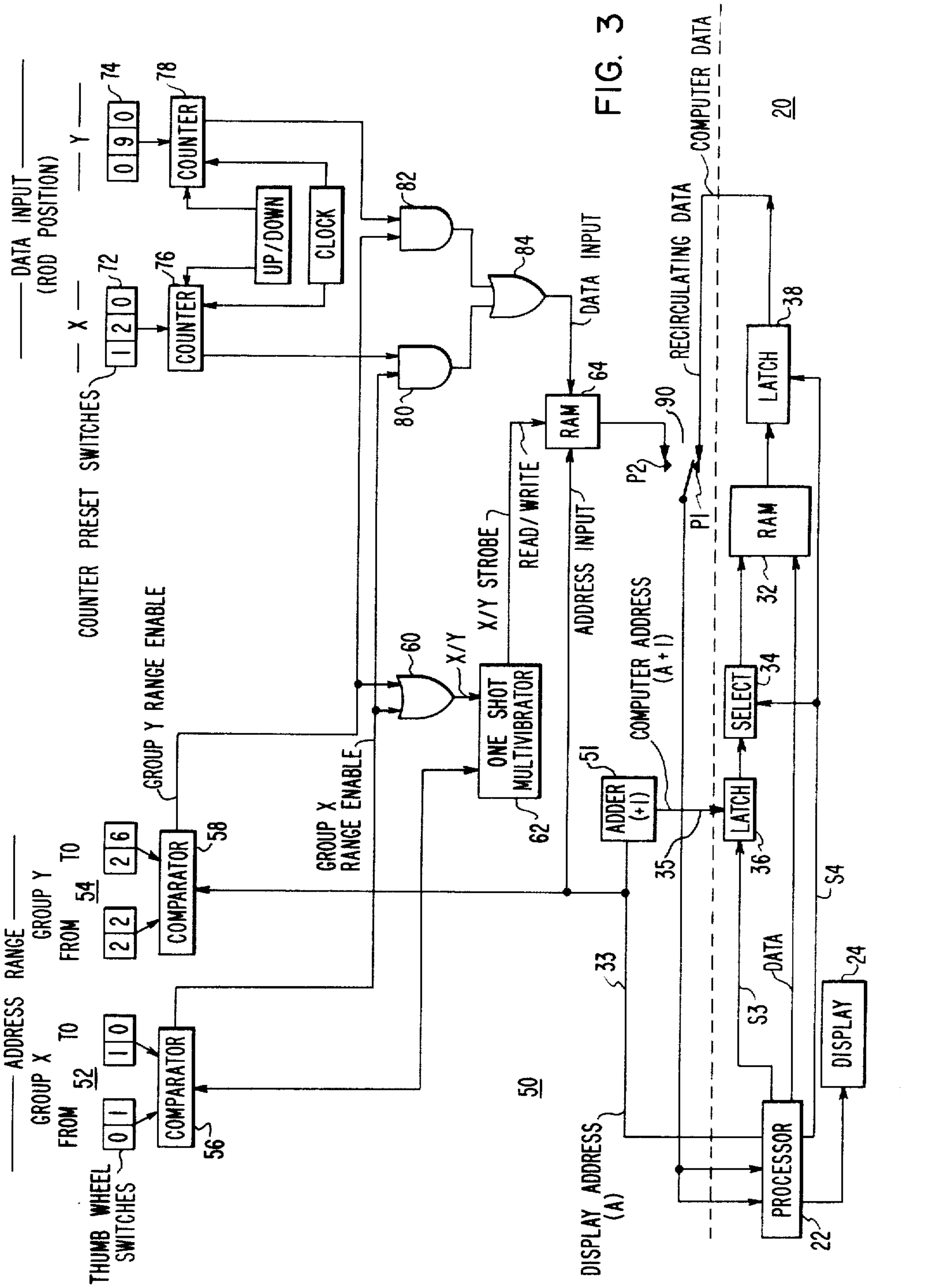
FIG. 3 is a schematic illustration of the combination of the display exerciser and processor/display circuitry of FIG. 1.

Referring to FIG. 3 there is schematically illustrated an implementation of the display exerciser 50. For the purposes of discussion it will be assumed that the data cabinets A and B of FIGS. 1 and 2 correspond to two groups X and Y of control rods wherein the control rods of group X are identified with addresses 1 through 10, and the control rods of group Y are identified with addresses 22 to 26. Thus, the thumbwheel switches 52 and 54 provide an operator with the capability of selecting one or more particular control rods of group X or group Y for introducing operating conditions corresponding to the selected data input via data input switches 72 and 74 which are operatively associated with the control rod addresses of group X and group Y respectively. A display address A from the processor 22 is supplied to comparators 56 and 58 wherein it is compared to the preset address locations of thumbwheel switches 52 and 54. In the event the address A is within the group X address range of 1 to 10 comparator 56 would generate a group X range enable signal which is gated through OR gate 60 to a one-shot multivibrator circuit 62. In the event address A corresponds to an address location between 22 and 26, comparator circuit 58 will develop a group Y range enable output signal which is gated through OR gate 60 to the one-shot multivibrator circuit 62. The output of the one-shot multivibrator circuit 62 functions as a read/write strobe input to the random access memory 64. The group X range enable output of comparator circuit 56 and the group Y range enable output of the comparator circuit 58 serve as inputs to AND gates 80 and 82 respectively. In the event the address A is within the group X address range, the group X range enable signal supplied to AND gate 80 will gate the data developed by preset data input switches 72 and counter 76 through OR gate 84 as data input to the random access memory 64. This data is written into the random access memory location corresponding to the display address A and is sequentially read out from the memory to be supplied to the processor 22 via switch 90.

In the event address A corresponds to a group Y address, the group Y range enable output of the comparator circuit 58 will gate data from data input switches 74 and counter 78 through OR gate 74 as data input to the random access memory 64 to be written at the address location corresponding to display address A. The counters 76 and 78 are illustrated as up/down counters which are clocked at a predetermined clock rate signal. Thus, the data input to the random access memory 64 may be clocked in either an increasing or decreasing count mode from the preset level set in switches 72 and 74 as determined by the up or down count mode of the counters 76 and 78 respectively.

The positioning of the operator control switch 90 in position P1 provides for recirculation of stored data from the random access memory 32 of the processor/display circuit 20 as input data to the processor 22, whereas the positioning of switch 90 in position P2 causes the data stored in random access memory 64 to be introduced as new data to the processor/display circuit 20.

The computer address for the processor/display circuit corresponds to the display address A incremented by 1, i.e., A+1, and is supplied to the select circuit 34 of the processor/display circuitry 20.

I claim:

1. In combination, a data acquisition and storage system wherein data from at least one data source is processed for display and is stored both for recirculation as displayed data and for access by an external central computer means wherein the data acquisition and storage system includes a data processor means having an input and an output including means for generating display addresses at said output for addressing the respective data sources and causing data from the data sources to be supplied to the input of said data processor means, a display means operatively coupled to the output of said data processor means to provide a visual display of the data from said data sources and the data recirculated from storage, and a storage means for retaining the data processed from the respective data sources in storage locations corresponding to the display addresses associated with the respective data sources, and computer interface circuit means responsive to an address data generated by an external central computer means to access and read out data stored in said storage means at an address location corresponding to said address data, the combination of:

a display exerciser means, and switching means for connecting said display exerciser means in parallel with said data acquisition and storage system while disconnecting said data sources from said data processor means and disconnecting said external central computer means from said computer interface circuit means of said data acquisition and storage system, said display exerciser means including data recirculating means for causing the data retained in a storage location to be continuously recirculated for display on said display means during the subsequent occurrence of the corresponding display address, said display exerciser means further includes a simulation data generating means, and selecting means for operatively connecting either said data recirculating means for recirculating data from said storage means as input data to said data processor means for display on said display means, or connecting said simulation data generating means to said data processor means, said simulation data generating means being responsive to the display address of said data processor means for displaying said simulation data on said display means to determine the operational integrity of the data acquisition and storage system.

2. In the combination as claimed in claim 1 wherein said data sources consist of control rods in a nuclear reactor facility, each control rod having a specific display address, said simulation data generating means of said display exerciser means including means for selecting the display address of a specific control rod and supplying simulation data to said data processor means in response to the corresponding display address generated by said processor means.

* * * * *